(No Model.)
J. D. BRUCE & F. C. WHITEHEAD.
LIQUID MEASURING APPARATUS.
No. 559,257.  Patented Apr. 28, 1896.
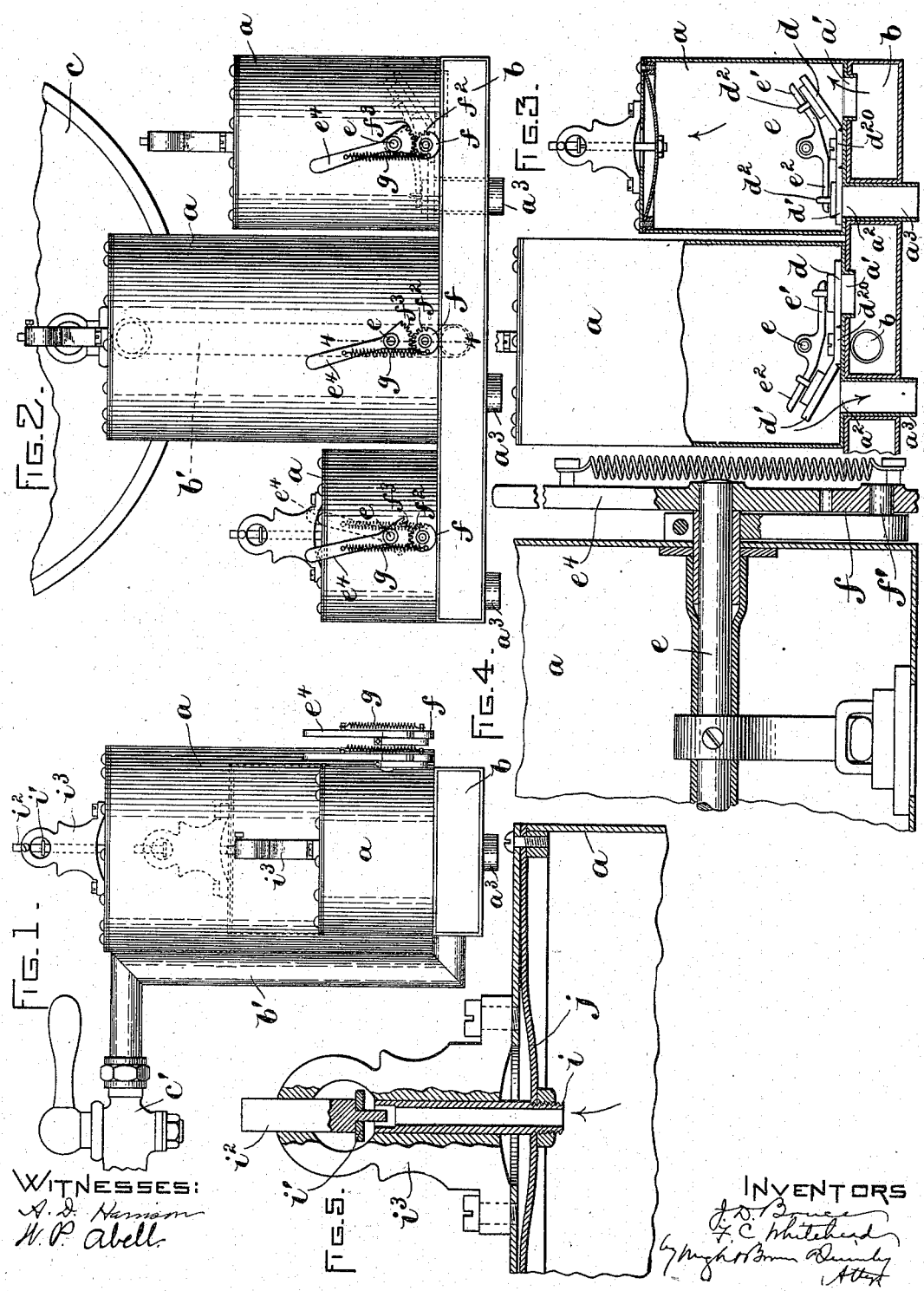

UNITED STATES PATENT OFFICE.

JAMES D. BRUCE AND FREDERIC C. WHITEHEAD, OF WALTHAM, MASSACHUSETTS, ASSIGNORS OF TWO-NINTHS TO ELIZABETH L. BRUCE, OF BOSTON, MASSACHUSETTS.

LIQUID-MEASURING APPARATUS.

SPECIFICATION forming part of Letters Patent No. 559,257, dated April 28, 1896.

Application filed June 20, 1895. Serial No. 553,419. (No model.)

*To all whom it may concern:*

Be it known that we, JAMES D. BRUCE and FREDERIC C. WHITEHEAD, of Waltham, in the county of Middlesex and State of Massachusetts, have invented certain new and useful Improvements in Liquid-Measuring Apparatus, of which the following is a specification.

This invention has for its object to provide a simple, convenient, and efficient liquid-measuring apparatus adapted for the use of grocers and others who sell liquids at retail, the apparatus being intended particularly for use in connection with molasses and other comparatively thick or syrupy liquids, although we do not limit ourselves in this particular.

The invention consists in the improved apparatus hereinafter described, the essential features of which are a measuring-receptacle having an inlet-port at its lower portion adapted to be connected with a source of supply—such as a hogshead or other vessel containing liquid—an outlet-port in its lower end in close proximity to the inlet, two valves controlling said ports, and a valve-operating device connected with said valves and arranged so that it may be caused to simultaneously close either valve and open the other, and a suitable air-vent, which is normally open and is adapted to be closed by the rise of the accumulation of liquid in the measuring-receptacle, the arrangement being such that when the outlet-valve is closed the inlet-valve is open, so that the receptacle is in communication with the source of supply and is filled therefrom until the accumulation of liquid closes the air-vent, whereupon the entrance of the liquid ceases and the measuring-receptacle remains charged until its contents are required, the valve-operating device being then caused to close the valve of the inlet-port and open the valve of the outlet-port, thus permitting the discharge of the liquid and preventing the entrance of more liquid from the source of supply, the air-valve opening automatically when the outlet-valve is opened, so that it permits the free escape of the charge of liquid and permits the entrance of another charge when the valve of the inlet-port is again opened and the valve of the outlet-port closed.

The invention also consists in certain improvements incidental to the general purposes of the invention.

Of the accompanying drawings, forming a part of this specification, Figure 1 represents a side elevation of an apparatus embodying our invention. Fig. 2 represents a front elevation of the same. Fig. 3 represents a sectional view of a portion of the apparatus shown in Fig. 2. Fig. 4 represents a section on line 4 4 of Fig. 2. Fig. 5 represents an enlarged vertical section through the vent-tube and the top of one of the receptacles.

The same letters of reference indicate the same parts in all the figures.

In the drawings, $a$ represents a measuring-receptacle, which is provided at its lower end with an inlet-port $a'$ and an outlet-port $a^2$. The said inlet-port communicates through a conduit $b$ with a source of supply, such as a molasses-hogshead $c$, the conduit $b$ being, as here shown, a chamber or casing below the receptacle $a$ and connected by a pipe $b'$ with the outlet-faucet $c'$ of the hogshead. We have here shown three measuring-receptacles $a$, all communicating with the conduit $b$, the receptacles being of different sizes, so that they are adapted to contain different quantities of fluid, one containing, for example, a gallon, another two quarts, and the third one quart. As the said receptacles are alike in their essential features, a description of one and its operation will suffice.

The outlet-port $a^2$ is provided with a discharge-tube $a^3$, which extends downwardly through the conduit $b$, and is adapted to deliver the liquid into a receptacle held below said conduit.

$d$ and $d'$ represent valves which are arranged to coöperate, respectively, with the inlet and outlet ports, said valves being here shown as hinged to a connecting-piece $d^{20}$, affixed to the bottom of the measuring-receptacle. In connection with the valves $d$ and $d'$ we employ an operating device whereby the said valves may be simultaneously operated, one being held open while the other is closed. We have here shown the said operating device as comprising a rock-shaft $e$, journaled in suitably-jacketed bearings in the walls of the receptacle $a$ and provided within the receptacle with two arms $e'$ $e^2$, which project in opposite directions and are engaged with loops $d^2$ $d^2$ on the valves $d$ $d'$. The rock-shaft $e$ projects through one side of the receptacle and has a lever $e^4$ affixed to its outer end, whereby it may be partially rotated. The arms $e'$ $e^2$ are formed so that when one valve is closed the other is opened, as shown in Fig. 3. Consequently the operating device may occupy either of two positions, in one of which it holds the valve $d$ open and the valve $d'$ closed, as shown at the right in Fig. 3, while in the other position it holds the valve $d$ closed and the valve $d'$ opened, as shown at the left in Fig. 3. The valve-operating device is held in either of the said positions with sufficient force to prevent its accidental movement by the means next described.

$f$ represents a disk journaled to turn upon a fixed stud $f'$ and having gear-teeth $f^2$ upon its perimeter, which engage corresponding gear-teeth $f^3$, formed upon the lower end of the lever $e^4$. A spring $g$ is affixed at one end to the disk $f$ and at its other end to the lever $e^4$, as shown in Fig. 2. When the lever $e^4$ is in the position shown in full lines in Fig. 3, the spring is located at one side of the center of oscillation of said lever and holds the valve-operating device in position to keep the outlet-valve $d'$ closed and the inlet-valve open. When the lever $e^4$ is moved to the position shown in dotted lines at the left of Fig. 2, the disk $f$ is partially rotated and carries the spring to the opposite side of the center of oscillation of the lever $e^4$, so that the spring then holds the valve-operating device in position to hold the inlet-valve closed and the outlet-valve open. It will be seen, therefore, that there is no liability of accidental shifting of the position of the valve-operating device and the partial opening of both valves at the same time, which might ensue if the valve-operating device were accidentally displaced.

We provide an air-vent at the upper portion of the measuring-receptacle and means whereby the same may be opened and closed by the action of the liquid. As here shown, said vent comprises a tube $i$, which is affixed to and passes through a flexible diaphragm $j$, affixed to the upper portion of the receptacle $a$ within the latter, said diaphragm constituting a liquid-tight closure for the upper end of the receptacle, excepting the orifice or passage through the tube $i$, and being limited in its upward movement or flexure by the top of the receptacle. The upper end of the tube $i$ constitutes a valve, which is adapted to close against a valve-seat $i'$, affixed to the receptacle, said seat being preferably a compressible annular washer secured to the lower end of a rod $i^2$, which is attached to an arm or bracket $i^3$, affixed to the upper end or head of the receptacle $a$, the said bracket having an orifice in which the vent-tube $i$ is adapted to slide. The diaphragm $j$ normally drops at its central portion, as shown in Fig. 5, and thus separates the upper end of the vent-tube $i$ from the seat $i'$, permitting free passage of air into or out of the receptacle. When the receptacle is being filled, air passes out through the vent-tube, and when the liquid reaches the diaphragm it raises the latter, with the tube $i$, thus seating the upper end of said tube on the seat $i'$ and preventing any escape of the liquid, and showing that the measure is full. When the liquid is withdrawn from the receptacle $a$, the diaphragm drops and permits an immediate entrance of air to take the place of the escaping liquid.

The operation of the apparatus is as follows: The conduit $b$ may be supposed to be constantly filled with liquid from the reservoir $c$. The valve-operating devices of the different measuring-receptacles are normally in position to close the outlet-ports and open the inlet-ports of said receptacles. Hence the receptacles are normally in communication with the conduit and are normally full of liquid. When it is desired to draw from either receptacle, its valve-operating device is moved to close the inlet-valve and at the same time open the outlet-valve. The contents of the receptacle therefore pass through the tube $a^3$ to the vessel placed below to receive it, the liquid being prevented from entering the receptacle $a$ by the closed inlet-valve. When the contents of the receptacle have been discharged, the valve-operating device is moved to again open the inlet-valve and close the outlet-valve, whereupon the receptacle is again filled and remains in communication with the conduit till the next drawing-off operation.

It will be seen that the provision of two or more measuring-receptacles of different capacities enables the operator to readily supply any quantity of liquid that may be desired.

We do not limit ourselves to the details of mechanism here shown, and may variously modify the same without departing from the spirit of our invention.

We claim—

1. A liquid-measuring apparatus comprising a measuring-receptacle having an inlet and an outlet port in its lower end, upwardly-opening valves controlling said ports, a rock-shaft journaled in bearings in the receptacle above said valves and having means for rocking it extending outside the receptacle and provided with two oppositely-projecting arms engaged with said valves, whereby when the shaft is turned one valve is raised and the other depressed.

2. A liquid-measuring apparatus comprising a measuring-receptacle having an inlet and an outlet port in its lower end, valves controlling said ports, a rock-shaft journaled in bearings in the receptacle above said valves and having means for rocking it extending outside the receptacle and provided with two oppositely-projecting arms engaged with said valves and adapted to simultaneously raise one valve and depress the other, and means for yieldingly holding said rock-shaft in either of two positions, as set forth.

3. A liquid-measuring apparatus comprising a measuring-receptacle having an inlet and an outlet port in its lower end, valves controlling said ports, a rock-shaft journaled in the receptacle and having two arms engaged with said valves and formed to hold the valves simultaneously in different positions, an external operating-handle on said rock-shaft, a rotatable disk geared to said handle, and a spring connecting said disk and handle and adapted to be transferred from one side of the rock-shaft to the other, as set forth.

4. In a liquid-measuring apparatus, a measuring-receptacle having in its lower portion an inlet and an outlet port, and means for controlling said ports, and in its upper portion a flexible diaphragm having its margin clamped to the wall of the receptacle and adapted to rise and fall at its central portion, means for limiting the upward movement or flexure of the diaphragm a vent-tube supported by the central portion of the diaphragm and extending through the top of the receptacle to a point considerably above said top and the diaphragm, and a fixed seat above the vent-tube against which the said tube is adapted to be moved by the upward movement of the diaphragm to close the vent, the said seat and the upper end of the tube being elevated above the diaphragm, as described, to prevent access of the liquid to the valve or seat before said liquid has acted on the diaphragm to close the valve, whereby adhesion of the valve to its seat is prevented.

In testimony whereof we have signed our names to this specification, in the presence of two subscribing witnesses, this 18th day of June, A. D. 1895.

JAMES D. BRUCE.
  FREDERIC C. WHITEHEAD.

Witnesses:
  A. D. HARRISON,
  W. P. ABELL.